July 13, 1937.  W. JANAS  2,087,192
SPRING COVER
Filed Dec. 23, 1936   2 Sheets-Sheet 1
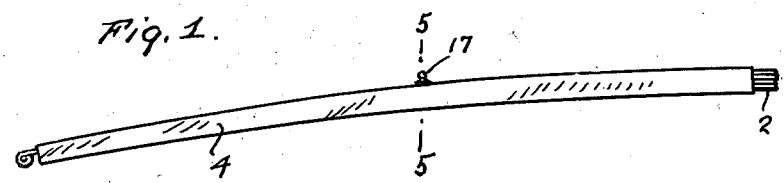
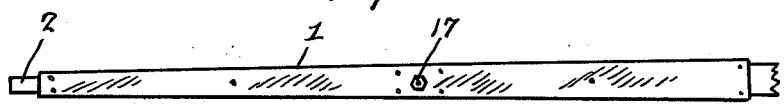
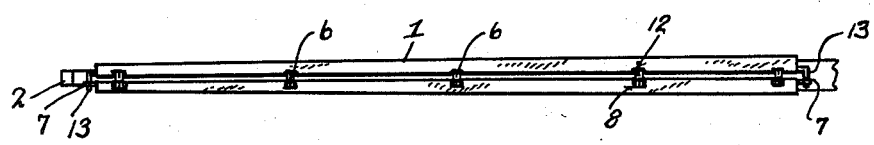
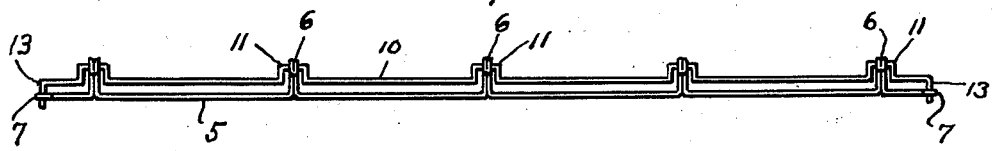
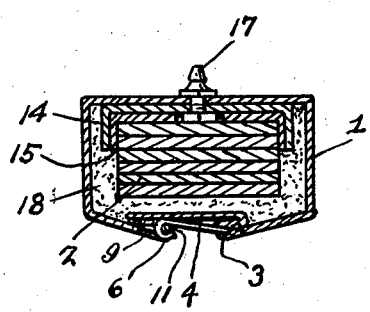
Inventor
W. Janas
By *Clarence A. O'Brien*
*Hyman Berman*
Attorneys July 13, 1937. W. JANAS 2,087,192
SPRING COVER
Filed Dec. 23, 1936 2 Sheets-Sheet 2

Inventor
W. Janas
By Clarence A. O'Brien
Hyman Berman
Attorneys

Patented July 13, 1937

2,087,192

UNITED STATES PATENT OFFICE 2,087,192

SPRING COVER

William Janas, Dundalk, Md.

Application December 23, 1936, Serial No. 117,409

6 Claims. (Cl. 267—37)

The present invention relates to new and useful improvements in spring covers particularly for automobiles and has for one of its important objects to provide, in a manner as hereinafter set forth, a device of this character which may be expeditiously mounted on a spring with a minimum of labor and without the use of special equipment.

Another very important object of the invention is to provide a cover of the aforementioned character which, in addition to excluding dirt, water, etc., will permit the spring to be kept thoroughly lubricated at all times by means of a special lubricating fitting inserted in said spring cover for eliminating squeaks and maintaining maximum flexibility.

Still another very important object of the invention is to provide a spring cover of the character described embodying novel means for firmly securing said cover in position on a spring.

Other objects of the invention are to provide an automobile spring cover which will be comparatively simple in construction, strong, durable, compact, light in weight and which may be manufactured at low cost.

All of the foregoing and still further objects and advantages of the invention will become apparent from a study of the following specification, taken in connection with the accompanying drawings wherein like characters of reference designate corresponding parts through the several views, and wherein:

Figure 1 is a view in side elevation of a cover constructed in accordance with the present invention, showing same mounted on a spring.

Figure 2 is a view in top plan thereof.

Figure 3 is a bottom plan view.

Figure 4 is a detail view of the securing means.

Figure 5 is a cross sectional view, taken substantially on the line 5—5 of Fig. 1.

Figure 6:
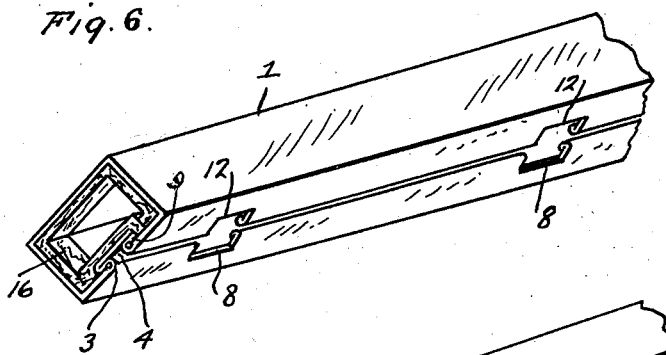
Figure 6 is a perspective view of an end portion of the invention with parts omitted.
Figure 7:
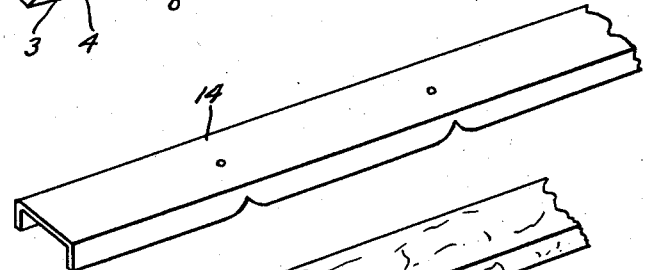
Figure 7 is a detail view in perspective of an end portion of the metallic channel member.
Figure 8:
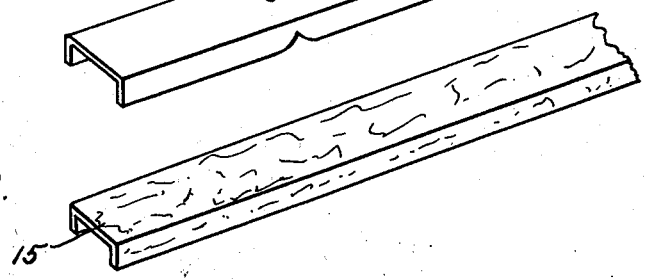
Figure 8 is a detail view in perspective of an end portion of the canvas lining.
Figure 9:
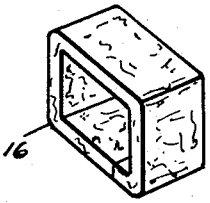
Figure 9 is a detail view in perspective of one of the felt packings.
Figure 10:
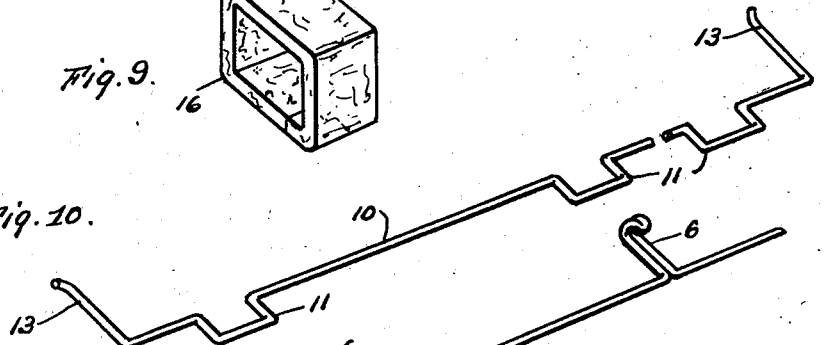
Figure 10 is a detail view in perspective of one of the securing members.
Figure 11:
Figure 11 is a detail view in perspective of an end portion of the other securing member.

Referring now to the drawings in detail, it will be seen that the embodiment of the invention which has been illustrated comprises a boot of suitable flexible material, preferably canvas treated with a suitable preservative. The boot 1 is shaped to substantially enclose a conventional leaf spring 2, as shown to advantage in Figs. 1 to 3, inclusive, and 5 of the drawings. One of the longitudinal marginal portions of the boot 1 is folded inwardly upon itself and stitched in a manner to provide a hem 3 and terminates in a closure flap 4 which, when the cover is applied, extends beneath the other longitudinal marginal portion of said boot, as shown to advantage in Fig. 5 of the drawings. Mounted in the hem 3 is a wire rod 5 which is bent at spaced, intermediate points in a manner to provide hooks 6. The rod 5 extends beyond the ends of the hem 3 and terminates in hooks 7. The hem 3 is provided with openings 8 which accommodate the hooks 6.

The other longitudinal marginal portion of the flexible boot 1 is folded inwardly upon itself and stitched in a manner to provide a hem 9. Mounted in the hem 9 is a wire rod 10 which is formed to provide substantially U-shaped portions 11 at spaced, intermediate points. Openings 12 in the hem 9 accommodate the U-shaped portions 11 of the securing rod 10. The securing rod 10 extends beyond the ends of the hem 9 and terminates in right angularly projecting resilient arms 13 which are engageable in the hooks 7 of the securing rod 5 in the manner shown to advantage in Fig. 4 of the drawings.

Mounted in the boot 1 is a resilient metallic channel member 14 which receives the spring 2. Interposed between the metallic channel member 14 and the spring 2 is a flexible lining 15 of suitable material, preferably canvas. The boot 1 extends beyond the ends of the metallic channel member 14 and mounted therein are felt packings 16 which close the cover at its ends in a manner to prevent the escape of the lubricant. Mounted on the cover is a suitable fitting 17 through the medium of which said cover may conveniently be kept substantially full of a lubricant, as at 18 (see Fig. 5).

To apply the cover, the boot 1 is mounted longitudinally on the spring 2 with said spring engaged in the metallic channel member 14. The hooks 6 are then engaged in the substantially U-shaped portions 11 after which the securing rod 10 is turned and the arms 13 are engaged in the retaining hooks 7 thereby firmly securing said boot in position around said spring. Of course, the felt end packings 16 are placed in position prior to securing the boot 1 around the spring. As the rod 10 is rotated or turned to engage the arms 13 in the retaining hooks 7 the substantially U-shaped portions 11, in which the hooks 6 are engaged, draw the longitudinal edges of the boot 1 toward each other. As the lubricant 18 is consumed it may readily be replenished through the medium of the fitting 17.

It is believed that the many advantages of a spring, constructed in accordance with the present invention will be readily understood and although a preferred form of the device is as illustrated and described, it is to be understood that changes in the details of construction and in the combination and arrangement of parts may be resorted to which will fall within the scope of the invention as claimed.

What is claimed is:—

1. A spring cover comprising a flexible boot adapted to be wrapped around a spring, a rod mounted on one of the longitudinal marginal portions of said boot, spaced hooks on said rod, a rotatable rod mounted on the other longitudinal marginal portions of the boot and including substantially U-shaped portions engageable in the hooks, and coacting means on the first and second named rods for securing the latter in rotated position for securing the boot in position around the spring.

2. A spring cover comprising a flexible boot adapted to be wrapped around a spring, a rod mounted on one of the longitudinal marginal portions of said boot, spaced hooks on said rod, a rotatable rod mounted on the other longitudinal marginal portions of the boot and including substantially U-shaped portions engageable in the hooks, and coacting means on the first and second named rods for securing the latter in rotated position for securing the boot in position around the spring, said coacting means including hooks on the ends of the first named rod, and arms on the ends of the second named rod engageable in the second named hooks.

3. A spring cover comprising a flexible boot adapted to be wrapped around a spring, hems on the longitudinal marginal portions of said boot, one of said hems terminating in a closure flap adapted to extend beneath the other marginal portion of the boot, a stationary rod mounted in one of the hems, spaced hooks on said stationary rod, a rotary rod mounted in the other hem, said rotary rod including longitudinally spaced, substantially U-shaped portions engageable in said hooks, the hems having spaced openings therein accommodating the hooks and the substantially U-shaped portions, and coacting means on the rods for securing the rotary rod in rotated position for securing the boot around the spring.

4. A spring cover comprising a flexible boot adapted to be wrapped around a spring, hems on the longitudinal marginal portions of said boot, one of said hems terminating in a closure flap adapted to extend beneath the other marginal portion of the boot, a stationary rod mounted in one of the hems, spaced hooks on said stationary rod, a rotary rod mounted in the other hem, said rotary rod including longitudinally spaced, substantially U-shaped portions engageable in said hooks, the hems having spaced openings therein accommodating the hooks and the substantially U-shaped portions, and coacting means on the rods for securing the rotary rod in rotated position for securing the boot around the spring, the rods projecting beyond the ends of the hems, said coacting means comprising hooks on the ends of the stationary rod, and arms on the ends of the rotary rod engageable in the last named hooks.

5. A spring cover comprising a flexible boot adapted to be wrapped around a spring, means for securing said boot in position around the spring, a metallic channel member mounted in the boot for the reception of the spring, a lining interposed between said channel member and the spring, and a lubricant fitting mounted on the boot and the channel member.

6. A spring cover comprising a flexible boot adapted to be wrapped around a spring to provide opposed marginal edges, a pair of rods secured to said marginal edges, respectively, one rotatable relative to the other, co-engaging devices on said rods, respectively, coacting upon rotation of said one rod to draw said rods together, and cooperating devices on said rods, respectively, interlocking to fix said one rod in rotated position.

WILLIAM JANAS.